(12) United States Patent
Benyamin et al.

(10) Patent No.: US 10,754,409 B1
(45) Date of Patent: Aug. 25, 2020

(54) ENERGY EFFICIENT ETHERNET WITH MULTIPLE LOW-POWER MODES

(71) Applicant: Aquantia Corporation, San Jose, CA (US)

(72) Inventors: Saied Benyamin, Calabasas, CA (US); Paul Langner, Fremont, CA (US); George Zimmerman, Manhattan Beach, CA (US)

(73) Assignee: Marvell Asia Pte., LTD., Singapore (SG)

( * ) Notice: Subject to any disclaimer, the term of this patent is extended or adjusted under 35 U.S.C. 154(b) by 119 days.

(21) Appl. No.: 16/143,254

(22) Filed: Sep. 26, 2018

(51) Int. Cl.
| | |
|---|---|
| *G06F 1/32* | (2019.01) |
| *H04L 12/12* | (2006.01) |
| *H04L 12/40* | (2006.01) |
| *G06F 1/3206* | (2019.01) |
| *G06F 1/3209* | (2019.01) |

(52) U.S. Cl.
CPC .......... *G06F 1/3206* (2013.01); *G06F 1/3209* (2013.01); *H04L 12/12* (2013.01); *H04L 12/40039* (2013.01); *H04L 12/40136* (2013.01)

(58) Field of Classification Search
CPC ..... G06F 1/3206; G06F 1/3209; H04L 12/12; H04L 12/40039; H04L 12/40136
See application file for complete search history.

(56) References Cited

U.S. PATENT DOCUMENTS

| | | | |
|---|---|---|---|
| 2010/0046543 A1* | 2/2010 | Parnaby | H04L 12/12 370/465 |
| 2010/0241880 A1* | 9/2010 | Wertheimer | G06F 1/3209 713/310 |
| 2013/0189932 A1* | 7/2013 | Shen | H04W 52/0232 455/68 |

* cited by examiner

*Primary Examiner* — Stefan Stoynov

(57) ABSTRACT

An Ethernet transceiver is disclosed. The Ethernet transceiver includes transceiver circuitry including transmit circuitry, receive circuitry, and adaptive filters. The transceiver circuitry is configurable to operate in one of two low-power modes. A first low-power mode includes update operations for the adaptive filters. A second low-power mode includes turning off at least one of the transmit circuitry and the receive circuitry, and omitting update operations for the adaptive filters.

20 Claims, 6 Drawing Sheets

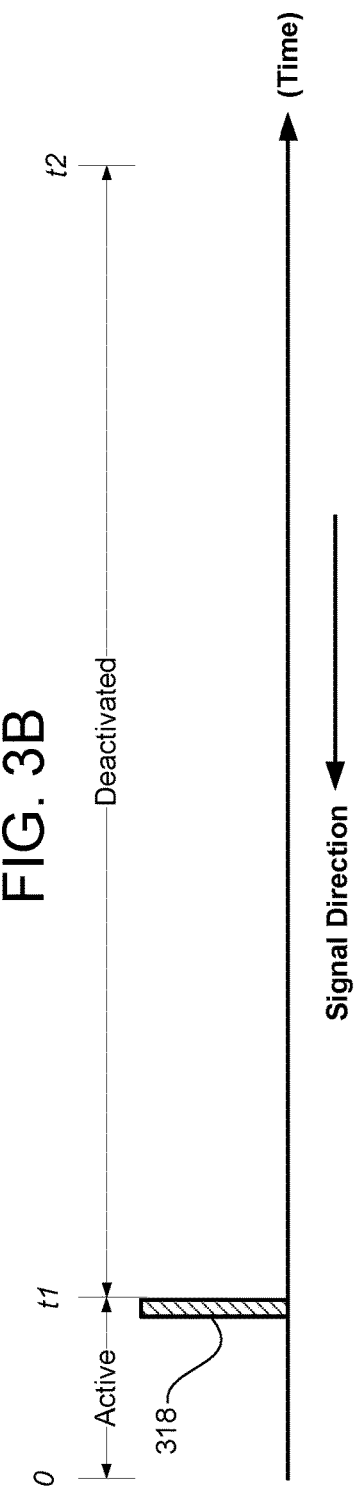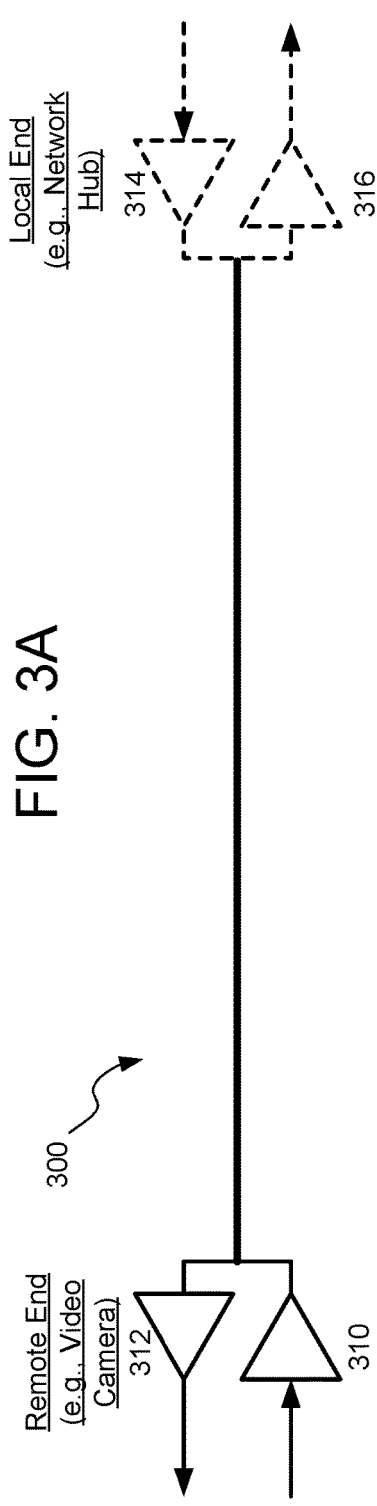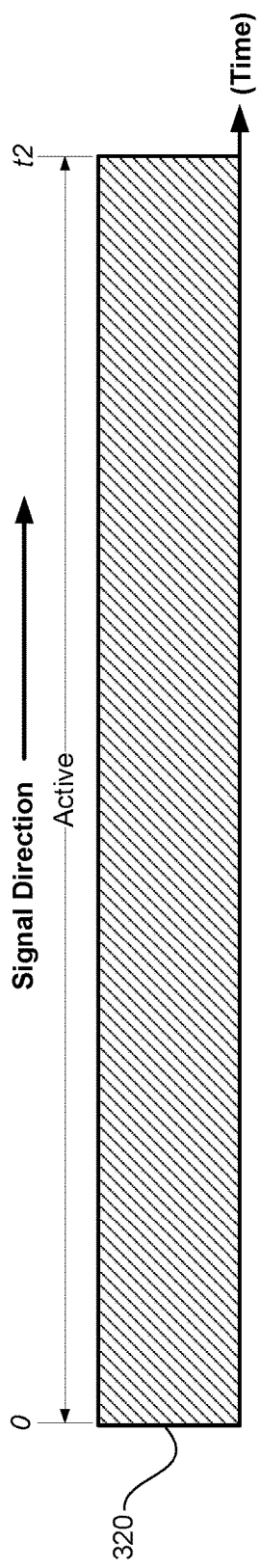

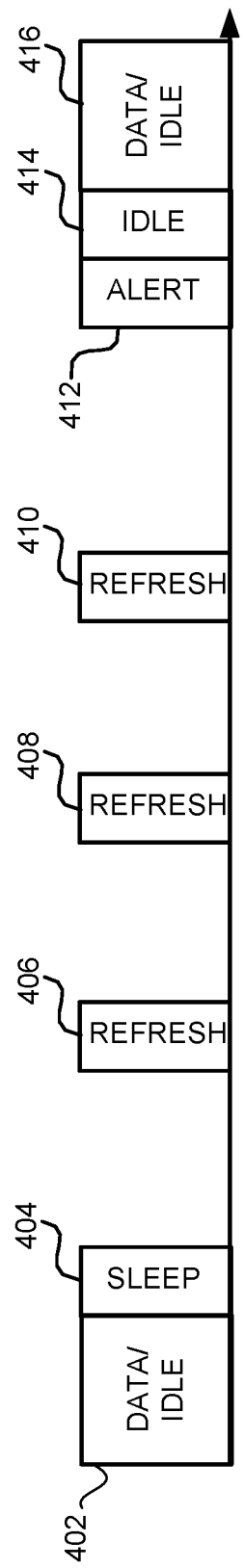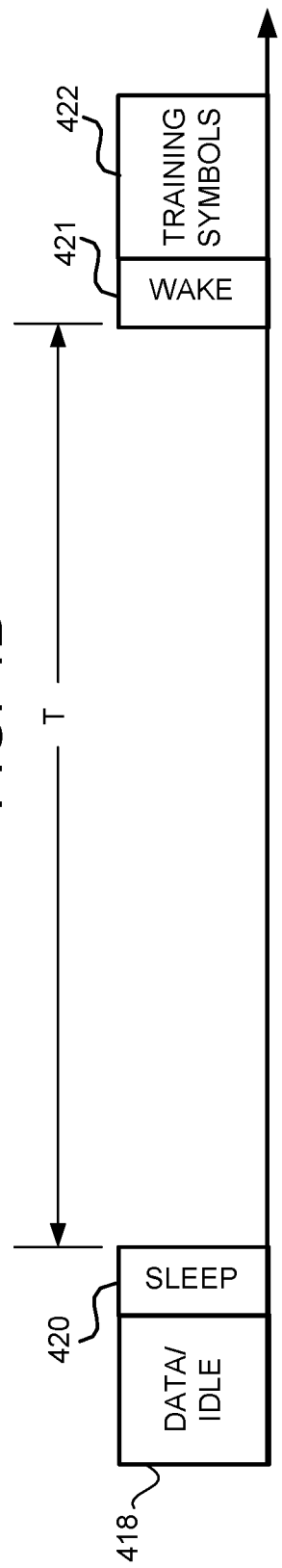

ENERGY EFFICIENT ETHERNET WITH MULTIPLE LOW-POWER MODES

TECHNICAL FIELD

The disclosure herein relates to communications systems, and more specifically to high-speed Ethernet systems and methods.

BACKGROUND

High-speed Ethernet standards, such as 10GBASE-T and NBASE-T, generally utilize four wired physical channels with the ability to achieve aggregated data rates from 1 Gbps up to 10 Gbps. The links are often bursty, where data transfers typically occur during a small portion of the time that the links are active. The transceiver circuitry, however, consumes power at all times while the links are active.

To minimize power consumption during periods of no data transfer, a low power mode of operation, commonly referred to as Energy Efficient Ethernet (EEE), has now been standardized. The low-power mode involves periodically transmitting refresh symbols between link partners to keep the link "active." The refresh symbols generally allow each link partner to update its filter coefficients and timing information to maintain synchronization with the other link partner.

While beneficial for its intended applications, the EEE low-power mode for 10GBASE-T Ethernet transceivers specifies refresh rates that don't allow the transceiver circuitry to truly turn off during periods of no data transfer. This may be problematic for new Ethernet applications where minimal power consumption is of utmost importance.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3A illustrates one of the four 10GBASE-T channels of FIG. 2.

FIG. 3B illustrates a first amount of data traveling on the upstream link of the channel of FIG. 3A.

FIG. 3C illustrates a second amount of data traveling on the downstream link of the channel of FIG. 3A.

FIG. 4A illustrates various transferred signals across a data link between master and slave devices during a first low-power mode of operation.

FIG. 4B illustrates transmit timing of signals by a slave transmitter across a data link from a slave device to a master device during a second low-power mode of operation.

FIG. 4C illustrates receiver sampling timing at a receiver of the master device to detect the transmitted wake symbol of FIG. 4B.

DETAILED DESCRIPTION

Methods and apparatus for Ethernet network, transceivers and links are disclosed. In one embodiment, an Ethernet transceiver is disclosed. The Ethernet transceiver includes transceiver circuitry including transmit circuitry, receive circuitry, and adaptive filters. The transceiver circuitry is configurable to operate in one of two low-power modes. A first low-power mode includes update operations for the adaptive filters. A second low-power mode includes turning off at least one of the transmit circuitry and the receive circuitry, and omitting update operations for the adaptive filters.

In another embodiment, an Ethernet network is disclosed. The Ethernet network includes a network hub including multiple Ethernet ports and multiple network devices coupled to the multiple Ethernet ports via multiple Ethernet data links. Each of the multiple Ethernet data links includes an upstream path for transferring data from the network hub to a given network device, and a downstream path for transferring data from the given network device to the network hub. Each of the Ethernet data links is configurable to operate in one of two low-power modes. A first low-power mode includes powering down unused transceiver circuitry and performing filter update operations on the link. A second low-power mode includes powering down unused transceiver circuitry, and omitting filter update operations on the link.

Figure 1:
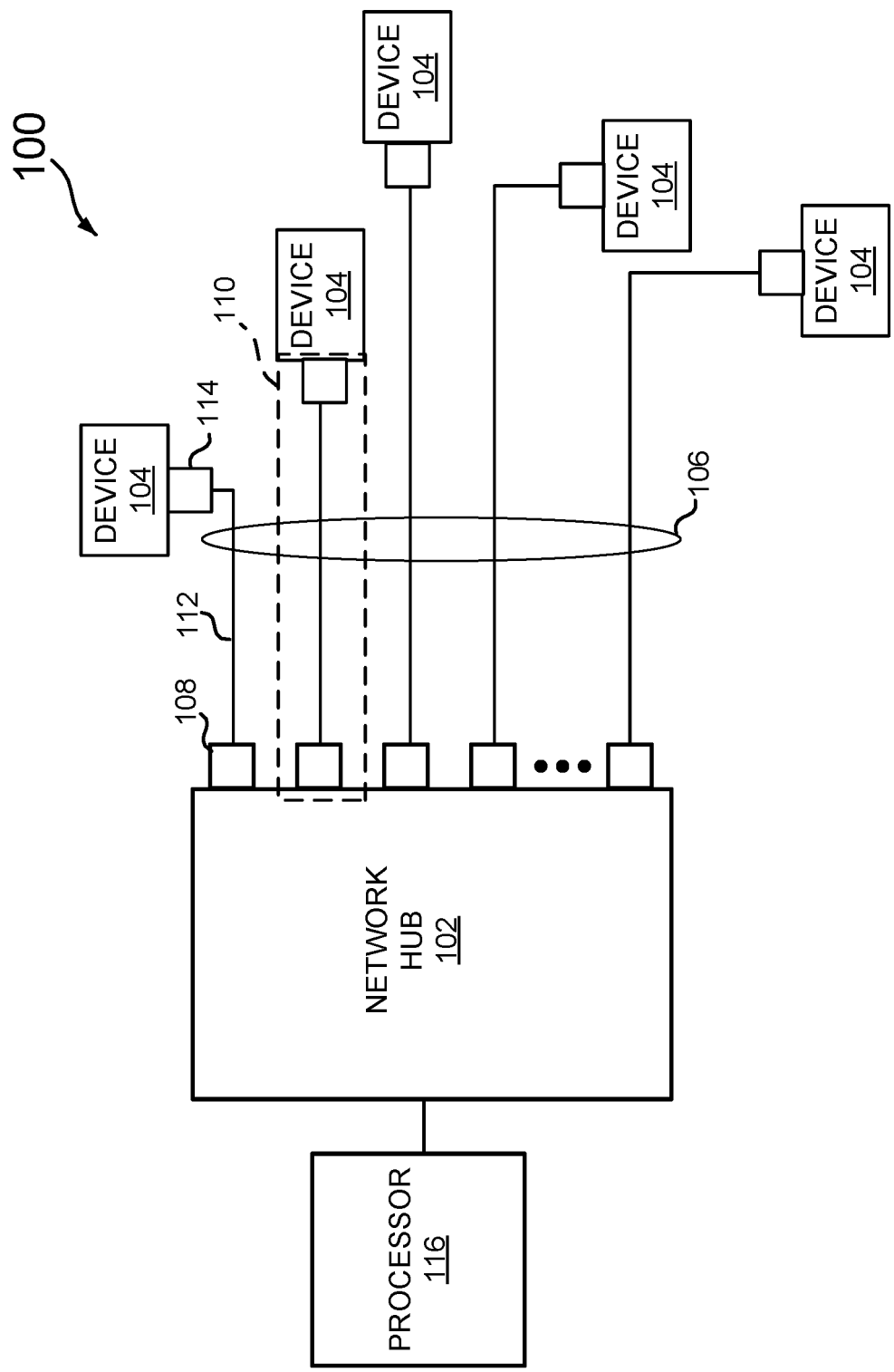
FIG. 1 illustrates one embodiment of an Ethernet network.

Referring now to FIG. 1, one embodiment for a high-speed Ethernet network, generally designated 100, includes a network hub 102 that interfaces with multiple network devices 104, via internally-routed wired signaling media 106. For one embodiment, the entire system is self-contained within a fixed framework, such as a body of a motor vehicle, aircraft or boat.

Further referring to FIG. 1, the network hub 102 may take the form of a network switch or router to direct traffic between various network nodes defined by the network devices 104. The network hub 102 may include, for example, forty-eight ports 108 to support an equal number of data links 110. Each port 108 connects to a local end of an Ethernet cable 112. A remote end of each cable 112 connects to a network device port 114, connected to, for example, a sensor, video camera or telematics data monitoring device. For one embodiment, each network device 104 generates data associated with, for example, imaging information from a certain angle of a right-front fender area of an automobile. Multiple nodes or network devices 104 may thus feed parameter data to the network hub 102, which may then direct the data to, for example, one or more processors 116 to evaluate the data and provide command and control signals to, for example, an autonomous driving system.

Figure 2:
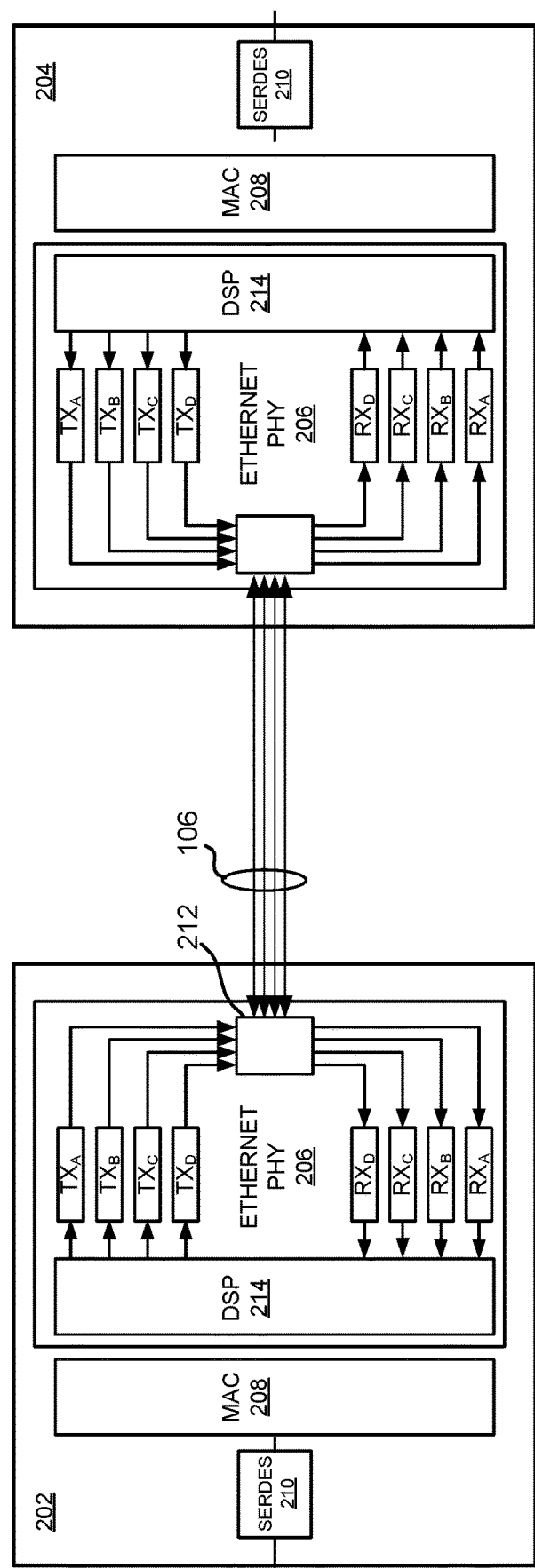
FIG. 2 illustrates one embodiment of a bidirectional Ethernet channel employed in the Ethernet network of FIG. 1.

FIG. 2 illustrates one embodiment of a data link 110 used in the network of FIG. 1. Each of the data links 110 includes a local Ethernet transceiver 202 and a remote transceiver 204. The local transceiver 202 is disposed in one of the ports 108 of the network hub 102, while the remote transceiver is disposed on a network device 104. For purposes of brevity, only the local transceiver circuitry will be described, with the understanding that the remote transceiver circuitry is similarly formed.

Further referring to FIG. 2, for one embodiment, the local transceiver 202 comprises a 10GBASE-T integrated circuit chip that incorporates a physical circuit (PHY) 206, a media access controller (MAC) 208, and a serializer/deserializer (SERDES) interface 210. The PHY 206 incorporates an analog front-end that employs four input/output (I/O) driver/receiver circuits $TX_A/RX_A$, $TX_B/RX_B$, $TX_C/RX_C$ and $TX_D/RX_D$ to transceiver data over four physical channels in accordance with a 10GBASE-T protocol. The transceiver I/O circuits interface with the Ethernet cable media 106 via a connector interface, at 212. The PHY 206 includes digital signal processing (DSP) logic 214 that provides interference cancellation functionality in response to noise and interference thresholds based on signaling media. The MAC circuit 124 interfaces the PHY 102 with a SERDES circuit 128. While most of the discussion herein emphasizes use of a 10GBASE-T transceiver integrated circuit (IC) chip, NBASE-T transceiver IC chips that offer variable data rates between 1 Gbps up to 25 Gbps may also be employed.

In some embodiments, the local and remote transceivers 202 and 204 may be configurable as "master" and "slave" devices. When configured as a "master" device, a transceiver provides a timing signal embedded in data transfers to the slave, such that the link maintains timing synchronization. Since the reference timing signal originates with the "master", no clock-data recovery (CDR) operations are required at the receive circuitry of the "master" device. A "slave" device, on the other hand, has its CDR circuitry enabled to receive data from the "master" and extract timing information from the data.

In some applications, data transfers along the links of FIGS. 1 and 2 may involve significant amounts of data from a given network device to the network hub (referred to herein as a downstream path), while little to no data may transfer from the network hub to the network device (referred to herein as an upstream path). An example of such a link might involve a video camera that generates image data for transfer along the downstream path, while occasionally receiving control and/or command information from the network hub along the upstream path.

FIG. 3A illustrates each end of a data link 300, with a remote end employing a transmitter and receiver 310 and 312, and a local end with corresponding a corresponding link partner receiver and transmitter 314 and 316. FIG. 3B shows an example of a first amount of data 318 in the form of control information transferred along the link in the upstream path (of the simultaneously bidirectional link), while FIG. 3C illustrates a second amount of data 320 in the form of image information transferred along the link in the downstream path.

In an effort to minimize power consumption, the link is configurable to operate in one or two low-power modes of operation. A first low-power mode corresponds to the currently standardized Energy Efficient Ethernet (EEE) low-power idle mode of operation, consistent with the standardized EEE mode in Institute of Electrical and Electronics Engineers (IEEE) 802.3az. FIG. 4A illustrates a timing diagram showing symbols transmitted over time via the data links described above consistent with the EEE low-power idle mode. A given link enters the mode by ending a data transfer with an idle symbol, at 402. A "sleep" symbol is immediately sent to place the link in a low-power state, at 404. Periodic refresh symbols, such as a t 406, 408 and 410 are sent along the link to maintain timing synchronization. The refresh symbols allow the link partner to update its filters using adaptive algorithms while the link is in its low-power state. The first low-power mode in this EEE state enables for a fast return to active link status when ready. The link wakes up through use of an alert signal, at 412, followed by a wake symbol or series of idles, at 414. The alert signal allows detection without propagating data through the DSP of the receive channel. An idle symbol is then provided, at 415, and then true data, at 416. Since filter updates were periodically carried out while the link was "inactive", the link does not need any training and may be brought up into a fully-operational state.

For some situations, a fast return to active link status is less of a priority than the power consumption of the link, even in a EEE low-power state. To achieve maximum power savings, such that portions of a given transceiver are fully "off" for appreciable periods of time, a second low-power mode of operation may employed to achieve even further power reductions, as more fully explained below.

Referring now to FIG. 4B, the second low-power mode of operation generally allows for a "slave" device to completely power-off its transmit circuitry for an extended duration of time. FIG. 4B illustrates symbols generated by a "slave" transmitter for transfer along the upstream path, including an idle symbol, at 418, appended to a last portion of data, and an "ultra-sleep" symbol, at 420. The "ultra-sleep" symbol employs different characteristics than the "sleep" symbol used in the first low-power mode. Initiation of the second low-power mode takes place with the slave transmitter transmitting the ultra sleep symbol. Following transmission of the ultra-sleep symbol, the slave transmitter circuit completely shuts down for the duration T, until prompted to wake (such as through a triggering control signal). When prompted, the slave transmitter generates and transmits an alert signal in the form of a low frequency PAM2 signal, at 421, at a time slot corresponding to an LDPC frame boundary, such as the interval $T_{DF}$. The low-frequency PAM2 signal enables the use of inexpensive and low-power detection circuitry at the master receiver. An extended wake period is then provided in order for the upstream link to train, which may involve transmission of one or more refresh symbols for the training sequence.

From the "master" side of the link, and referring now to FIG. 4C, in the second low-power mode, the receiver circuitry of the "master" may be in a reduced power state such that data input sampling circuitry only powers on for time intervals, such as at 424, corresponding to expected data frame boundaries, such as at $T_{DF}$. In this manner, the receive circuitry of the master may detect the alert symbol generated by the "slave" during the second mode of operation. The transmit circuitry of the "master" remains in either an active mode (to carry out image data transfers to the "slave") or first low-power mode in order to preserve the timing of the link.

Figure 5:
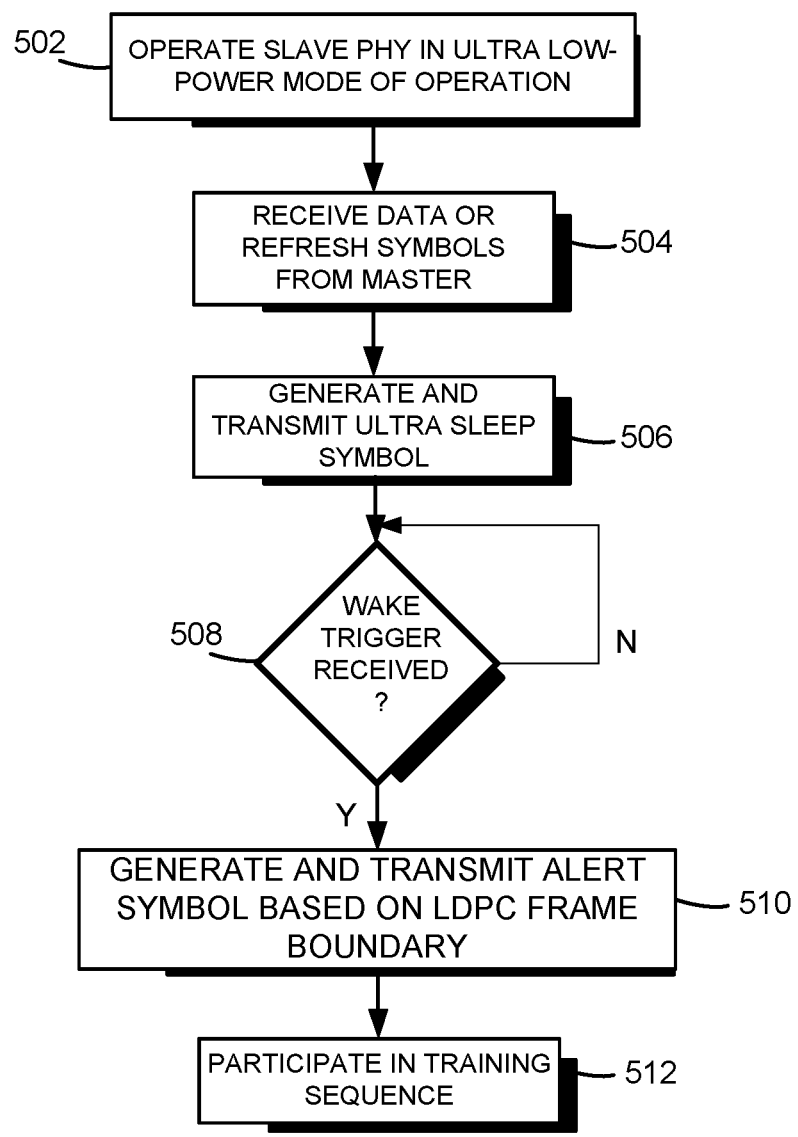
FIG. 5 illustrates one embodiment of steps in a method of operating a slave Ethernet transceiver device.

FIG. 5 illustrates a flowchart of steps consistent with the description above in the context of a "slave" device operating in the second, or "ultra" low-power mode of operation. At 502, the slave device is configured to operate in the ultra low-power mode. The receive circuitry for the slave receives either real data or refresh symbols from the master, at 504. The configuring may be triggered by any of several different events, including for example a consistently low data rate associated with the upstream path. The slave transmit circuitry generates and transmits an "ultra sleep" symbol along the link, and turns off, at 506. Upon receipt of a wake trigger signal, detected at 508, the slave transmit circuitry turns back on and transmits an alert signal, at 510, coincident with an LDPC frame timing boundary and, for one embodiment, in the form of an easily detectable PAM-2 waveform. Once the master device detects the alert symbol, a full Ethernet training sequence of operations may be performed, at 512, to bring the upstream path up to an active state.

Figure 6:
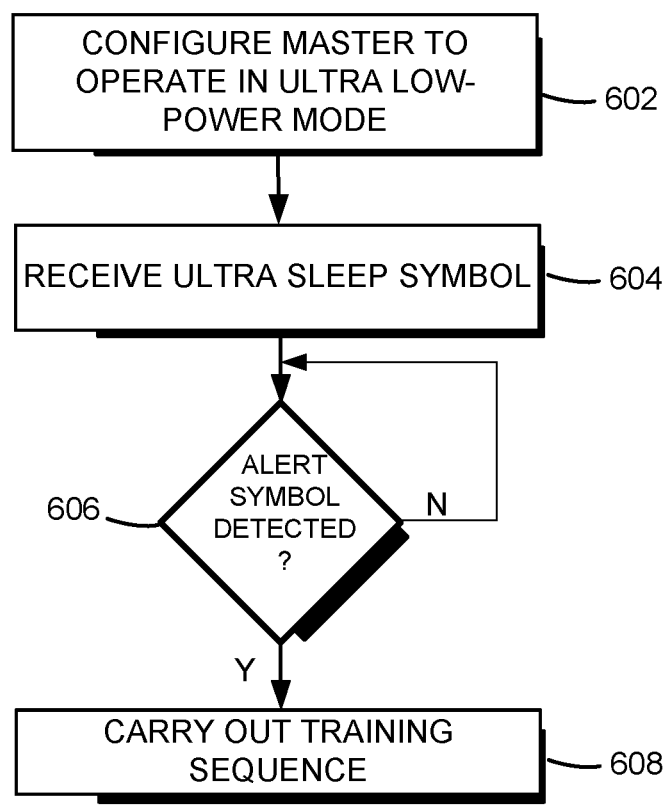
FIG. 6 illustrates one embodiment of steps in a method of operating a master Ethernet transceiver device.

FIG. 6 illustrates a flowchart of steps consistent with the above in the context of the "master" device operating in the "ultra" low-power mode of operation. At 602, the master device is configured to operate in the ultra low-power mode at the same time that the slave is so configured. The master receive circuitry receives the "ultra sleep" symbol generated by the slave along the link, at 604, and enables a periodic monitoring sequence to detect an alert symbol, at 606. For one embodiment, the periodic monitoring generally turns on during windows that coincide with predetermined timing windows known to the master device, such as LDPC frame boundaries. Upon detecting the alert sequence from the slave, the upstream path may go into an extended wake period involving sufficient time to carry out a full training sequence, at 608.

The network architecture described above lends itself well to autonomous driving applications where bursty data rates upwards of 8 Gbps to 10 Gbps may be necessary in an effort to evaluate vast swaths of data generated by numerous video cameras and sensors. By incorporating a 10GBASE-T Ethernet network within an autonomous driving system, proven high-speed communications within an automotive environment may be realized. Additionally, by altering the 10GBASE-T communications channels to support multiple low-power mode configurations, significant power savings may be realized.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. An Ethernet transceiver, comprising:
   transceiver circuitry including transmit circuitry, receive circuitry, and adaptive filters;
   wherein the transceiver circuitry is configurable to operate in one of two low-power modes, including
   a first low-power mode including update operations for the adaptive filters, and
   a second low-power mode including turning off at least one of the transmit circuitry and the receive circuitry, and omitting update operations for the adaptive filters.

2. The Ethernet transceiver of claim 1, wherein:
   the update operations involve transferring refresh symbols.

3. The Ethernet transceiver of claim 1, wherein:
   the transceiver circuitry is configurable as one of a master device and a slave device, and
   wherein operation in the second low-power mode for a master device is different than for a slave device.

4. The Ethernet transceiver of claim 3, wherein:
   with the transceiver circuitry configured as a master device in the second low-power mode
   the receive circuitry is operative to periodically monitor for an alert symbol transferred from a slave link partner.

5. The Ethernet transceiver of claim 4, wherein:
   the receive circuitry is operative to periodically monitor for an alert symbol based on an LDPC frame timing boundary.

6. The Ethernet transceiver of claim 3, wherein:
   with the transceiver circuitry configured as a slave device in the second low-power mode the transmit circuitry is operative to transfer an alert symbol to a master link partner upon waking to transfer data.

7. The Ethernet transceiver of claim 6, wherein:
the transmit circuitry is operative to transfer an alert symbol to a master link partner based on an LDPC frame timing boundary.

8. An Ethernet network, comprising:
a network hub including multiple Ethernet ports;
multiple network devices coupled to the multiple Ethernet ports via multiple Ethernet data links;
wherein each of the multiple Ethernet data links includes an upstream path for transferring data from the network hub to a given network device, and a downstream path for transferring data from the given network device to the network hub; and
wherein each of the Ethernet data links is configurable to operate in one of two low-power modes, including
   a first low-power mode including powering down unused transceiver circuitry and performing filter update operations on the link, and
   a second low-power mode including powering down unused transceiver circuitry, and omitting filter update operations on the link.

9. The Ethernet network of claim 8, wherein:
solely the upstream path for each Ethernet data link operates in the second low-power mode.

10. The Ethernet network of claim 8, wherein:
the multiple network devices comprise at least one from the group including a sensor, video camera or telematics data monitoring device.

11. The Ethernet network of claim 10, wherein:
the network hub and the multiple network devices are disposed within the body of a motor vehicle.

12. The Ethernet network of claim 11, wherein:
the multiple network devices generate data for use in an autonomous driving system.

13. A method of operation for an NBASE-T Ethernet transceiver, comprising:
providing transceiver circuitry including transmit circuitry, receive circuitry, and adaptive filters; and
configuring the transceiver circuitry to operate in one of two low-power modes, including
   a first low-power mode including updating the adaptive filters, and
   a second low-power mode including turning off at least one of a transmit circuit and a receive circuit, and omitting update operations for the adaptive filters.

14. The method of claim 13, wherein:
the updating includes transferring refresh symbols having filter coefficient information.

15. The method of claim 13, further comprising:
configuring the transceiver circuitry as one of a master device and a slave device, and
wherein operation in the second low-power mode for a master device is different than for a slave device.

16. The method of claim 15, wherein:
with the transceiver circuitry configured as a master device in the second low-power mode,
   periodically monitoring for an alert symbol transferred from a slave link partner.

17. The method of claim 16, wherein:
the periodically monitoring is based on an Ethernet data frame timing boundary.

18. The method of claim 15, wherein:
with the transceiver circuitry configured as a slave device in the second low-power mode
   transferring an alert symbol to a master link partner upon waking to transfer data.

19. The method of claim 18, wherein:
the transferring is based on an LDPC frame timing boundary.

20. The method of claim 19, further comprising:
after transferring the alert symbol, performing a training operation with the master link partner.

\* \* \* \* \*